US011725730B2

(12) United States Patent
Pelsoeczy et al.

(10) Patent No.: US 11,725,730 B2
(45) Date of Patent: Aug. 15, 2023

(54) SPACER SPRING FOR A THREE-PART OIL SCRAPER RING AND THREE-PART OIL SCRAPER RING HAVING SAID SPACER SPRING

(71) Applicant: FEDERAL-MOGUL BURSCHEID GMBH, Burscheid (DE)

(72) Inventors: Laszlo Pelsoeczy, Kurten (DE); Dirk Barenreuter, Odenthal (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 188 days.

(21) Appl. No.: 16/976,564

(22) PCT Filed: Jan. 10, 2019

(86) PCT No.: PCT/EP2019/050507
§ 371 (c)(1),
(2) Date: Aug. 28, 2020

(87) PCT Pub. No.: WO2019/166144
PCT Pub. Date: Sep. 6, 2019

(65) Prior Publication Data
US 2021/0003217 A1     Jan. 7, 2021

(30) Foreign Application Priority Data
Feb. 28, 2018   (DE) ............... 10 2018 104 594.8

(51) Int. Cl.
*F16J 9/06*   (2006.01)
(52) U.S. Cl.
CPC ............... *F16J 9/068* (2013.01); *F16J 9/066* (2013.01)
(58) Field of Classification Search
CPC .............. F16J 9/066; F16J 9/067; F16J 9/068
See application file for complete search history.

(56) References Cited

U.S. PATENT DOCUMENTS

| | | | | |
|---|---|---|---|---|
| 345,767 A | * | 7/1886 | Buckley | F16F 1/02 |
| | | | | 5/267 |
| 2,664,328 A | * | 12/1953 | Hamm | F16J 9/068 |
| | | | | 277/480 |

(Continued)

FOREIGN PATENT DOCUMENTS

| | | | |
|---|---|---|---|
| FR | 1267207 A | | 7/1961 |
| FR | 1398459 A | * | 6/1964 |
| GB | 996943 A | | 6/1965 |

OTHER PUBLICATIONS

International Search Report, dated Apr. 11, 2019 (PCT/EP2019/050507).

*Primary Examiner* — Nicholas L Foster
(74) *Attorney, Agent, or Firm* — Robert L. Stearns; Dickinson Wright PLLC

(57) ABSTRACT

The invention relates to an MF expander spring 20 for a three-part oil scraper ring 2, 4, 6, 8. It comprises a steel band, which is corrugated in a trapezoidal or diamond-shaped manner in the axial direction, wherein the MF expansion spring 20 has axial protrusions 30, 32, which are intended to abut in each case against an upper or lower oil scraper ring 34, 36 from the inside in the radial direction, in order to press said axial protrusions outwards against an inner cylinder surface, comprises upper flat sections 24, which are intended to abut against an upper scraper ring 34, 36 of a three-part oil scraper ring 2, 4, 6, 8 in the axial direction, comprises lower flat sections 23, which are intended to abut against a lower scraper ring 34 of the three-part oil scraper ring 2, 4, 6, 8 in the axial direction, and comprises flank sections 26, 28, which extend between the upper flat sections 24 and the lower flat sections 22. At least every second flank section 26 forms an acute angle (α) with the associated upper or lower flat sections 22, 24.

13 Claims, 2 Drawing Sheets

(56) References Cited

U.S. PATENT DOCUMENTS

| | | | | |
|---|---|---|---|---|
| 2,879,117 A | * | 3/1959 | Ellis | F16J 9/063 267/1.5 |
| 3,184,245 A | * | 5/1965 | Woolcott | F16J 9/068 277/480 |
| 3,834,716 A | * | 9/1974 | Okada | F16J 9/067 277/435 |
| 3,934,886 A | * | 1/1976 | Okada | F16J 9/145 277/435 |
| 5,087,055 A | * | 2/1992 | Ono | F16J 9/067 277/480 |
| 5,195,758 A | * | 3/1993 | Erway | F16J 9/066 277/480 |
| 2015/0184747 A1 | * | 7/2015 | Kunimoto | F16J 9/26 277/473 |
| 2021/0003217 A1 | * | 1/2021 | Pelsoeczy | F16J 9/068 |

* cited by examiner

SPACER SPRING FOR A THREE-PART OIL SCRAPER RING AND THREE-PART OIL SCRAPER RING HAVING SAID SPACER SPRING

The present invention relates to a spacer spring for a three-part oil scraper ring and an oil scraper ring comprising a spacer spring of this type.

Three-part oil scraper rings comprise two thin scraper rings, steel band rings or rails, respectively, or steel disks, which are held at a desired axial distance relative to one another by a spacer spring, wherein, on the other hand, the rails are simultaneously pressed with their running surfaces or scraper webs, respectively, against an inner cylinder wall.

In the case of the design of the spring of three-part oil scraper rings, three basic embodiments have established themselves, the VF system, the MF system, and the SS50 system.

In the case of the VF system, a spring is bent in a U-shaped manner of a slotted band steel, the opening of which points inwards. The leg ends are thereby bent outwards in the axial direction and can thus engage behind the scraper rings and can push them outwards. The slotted band steel forms a meander-shaped or corrugated structure, respectively, which allows the spring to exert forces in the radial direction and axial direction after bending into the U-shape.

In the case of the MF system, the spring consists of a steel band, which is corrugated axially or in the axial direction, respectively, and which can be made of chromium nickel steel. The spring corrugates between the two oil scraper rings and has protrusions, which also engage behind the oil scraper rings in order to push them outwards.

The SS50 system uses a spring, which, in contrast to the MF spring, is corrugated in the radial direction or radially, respectively. This springs offers a good elasticity in the radial direction, but only a limited elasticity in the axial direction.

Embodiments of the MF system have the disadvantage that in particular in the case of a trapezoidal wave structure of the MF spring, a state can occur, in the case of which the spring jams in the piston ring groove. In the case of motors with high compression ratios and high combustion chamber pressures, a so-called "blowby" can occur, in the case of which hot gases from the combustion chamber flow past the usual two upper piston rings and reach all the way to the oil scraper ring. In the case of a trapezoidal spring (the appearance of which corresponds to a square wave signal with for example 45° flanks), an excessive heating due to hot combustion chamber gases can result in that the spring expands and jams in the radial direction as well as in the axial direction. This state should not occur during normal operation, but can in particular lead to an excessive loading of the spring and of the scraper rings in rare operating states. This is the case when hot combustion gases reach into the groove of the oil scraper ring, and the MF expansion spring or MF spring expander, respectively, or an MF meander spring expander in the form of a triangular or trapezoidal wave thermally expands. The spring thereby expands in the circumferential direction and in the axial direction. The spring cannot give way in the axial direction and the spring gives way in the axial direction due to the oblique parts or flanks, respectively, of the spring. This is possible until the height of the oil scraper ring exceeds the width of the oil scraper groove in the piston, and the spring and thus the oil scraper ring jam in the piston ring groove and in the radial direction. A jamming in the radial direction leads to an increased wear of the scraper edges of the scraper rings. A jamming in the axial direction leads to an increased wear of the oil scraper ring groove flanks.

The present invention relates to an MF spring, which is designed to avoid a jamming of this type.

This problem is solved by means of the subject matters of the independent claims, preferred embodiments are described in the dependent claims.

An MF expander spring or an MF spring expander, respectively, for a three-part oil scraper ring is provided. The MF expander spring comprises a steel band, which is corrugated in a trapezoidal or diamond-shaped manner in the axial direction. The MF expansion spring thereby comprises axial protrusions, which are intended to abut in each case against an upper or lower oil scraper ring from the inside in the radial direction, in order to press said axial protrusions outwards against an inner cylinder surface, upper flat sections, which are intended to abut against an upper oil scraper ring of a three-part oil scraper ring in the axial direction, lower flat sections, which are intended to abut against a lower oil scraper ring of the three-part oil scraper ring in the axial direction, and flank sections, which extend between the upper flat sections and the lower flat sections. In the case of the MF expander spring, at least every second flank section forms an acute angle with the associated upper or lower flat sections. Here, this angle relates to the angle between the flak section and the respective flat section, and not to an angle, by which a steel band was bent, in order to form the meander spring; this applies for all embodiments, which use an angle $\alpha$. Here, at least every second flank of the spring is inclined opposite to the usual direction. When this spring heats up due to blowby gases, it can deflect in the circumferential direction as well as in the axial direction. A situation, as in the case of the conventional spring, which jams in the piston ring groove and jams in the circumferential direction, when it thermally expands, can no longer occur.

In the case of an exemplary embodiment of the MF expander spring, all flank sections form an acute angle with the associated upper or lower flat section. This feature thereby does not necessarily relate to the end or abutting sections, respectively, with which the ends of the spring touch. This embodiment relates to a trapezoidally corrugated expander spring. In contrast to the conventional expander spring, it decreases its height in response to a compression in the circumferential direction, and it decreases its length in the circumferential direction in response to a compression in the axial direction. It thus acts exactly opposite to the previous embodiment, which can jam in the piston ring grove in response to heating.

In the case of a further exemplary embodiment of the MF expander spring, every other second flank section forms an obtuse angle with the associated upper or lower flat section. This feature thereby does not necessary relate to the end or abutting sections, respectively, with which the ends of the springs touch. In fact, this embodiment corresponds to a diamond-shaped corrugation of the spring. It can thus always be compressed in the axial direction and the portions with acute angles ensure an elasticity in the circumferential direction.

In the case of an other exemplary embodiment of the MF expander spring, the acute angle is between 85° and 70°, preferably between 82° and 73°, and more preferably between 79° and 76°. These values currently suggest that a stronger expansion in an axial direction occurs in response to an even heating. The acute-angled portions of the flanks and a smaller expansion in the circumferential direction have the effect that a part of the expansion is compensated.

In the case of an additional exemplary embodiment of the MF expander spring, the obtuse angles are between 95° and 120°, preferably between 98° and 117°, and more preferably between 101° and 114°. In the case of these values, a particularly good effect of the spring is currently expected.

In the case of a further exemplary embodiment of the MF expander spring, an amount of a difference between the acute angle and 90° is larger than an amount of a difference between the acute angles and 90° in each case. The spring flanks, which are arranged at an acute angle, are inclined significantly stronger here or are flatter, respectively, than the obtuse-angled spring flanks. A strong overlap of the flat portions or support surfaces is attained in this embodiment, which promises a smaller wear of the contact surfaces between spring and scraper rings. This embodiment corresponds to a meander spring or a spring expander, respectively, which looks as if a row of Z-letters had been written in close sequence without a break, whereby the angles in the Z-letters are acute, and the angles of the lines form obtuse angles to the flat legs.

In the case of another exemplary embodiment of the MF expander spring, the acute angle is between 55° and 35°, preferably between 52° and 38°, and more preferably between 49° and 41°, wherein the obtuse angles are between 105° and 120°, preferably between 108° and 117°, and more preferably between 111° and 114°.

According to a further aspect of the present invention, another embodiment of an MF expander spring for a three-part oil scraper ring is provided. The MF expander spring comprises a steel band, which is corrugated in an s-shaped manner in the axial direction. The MF expander spring comprises:

axial protrusions, which are intended to abut in each case against an upper or lower oil scraper ring from the inside in the radial direction, in order to press said axial protrusions outwards against an inner cylinder surface, upper flat sections, which are intended to abut against an upper oil scraper ring of a three-part oil scraper ring in the axial direction, and lower flat sections, which are intended to abut against a lower oil scraper ring of the three-part oil scraper ring in the axial direction, and flank sections, which extend between the upper flat sections and the lower flat sections.

In the case of the MF expander spring, at least every second flank section is bent with the associated upper or lower flat sections with a rounding radius, wherein the MF expander spring was bent at least in the case of every second flank section by more than 180° compared with the associated upper or lower flat sections. The expander spring is thus bent back against itself in an arc. This only works when the bending radii are larger than an axial height of flank sections.

Here, the reflex angle relates to the angle, by which the flank section was bent out of the plane of the flat sections. Due to the fact that the flank section is bent in a radius, the angle is generally also the angle, which is formed by the flank section and the flat section, but wherein this angle cannot be seen easily. The name of the angle was selected so as to differ from the above-mentioned ones, because this angle can be understood more clearly here, this applies for all descriptions, which use an angle γ.

In the case of the conventional embodiments of the MF expander spring, the spring steel sheet was bent by less than 90° in order to form a type of wavy line.

In the case of the above embodiment according to the invention, the spring steel plate in the case of the MF expander spring was bent by more than 90° in the case of at least every second spring flank, in order to form a type of trapezoidal line or diamond-shaped line.

In the case of the present embodiment according to the invention, the MF expander spring was bent by more than 180°, which is only possible, however, when the bending point has a correspondingly large bending radius. This results in a type of expander spring, which is corrugated in an S-shaped manner and in the case of which the parts of the flanks run back to the flat sections again, from which they are bent away. The flank sections were not only bent at an obtuse angle, but already at a reflex angle with respect to the direction of the straight or flat sections, respectively.

In the case of an exemplary embodiment of the MF expander spring, all flank sections are bent with the associated upper or lower flat sections with a rounding radius, wherein the MF expander spring was bent at least in the case of every second flank section by more than 180° compared with the associated upper or lower flat sections. This limitation also does not refer to the end sections of the MF spring, which are to touch one another in an installed state.

In the case of a further exemplary embodiment of the MF expander spring, every second flank section is bent by an angle of 145° and 100°, preferably between 140° and 105°, and more preferably between 135° and 110°. These values currently suggest that in the case of an even heating, a stronger expansion occurs in an axial direction, wherein the returning part of the spring decreases an overall height or an overall height increase, respectively, of the spring in response to a heating.

In the case of another exemplary embodiment of the MF expander spring, a rounding radius in the case of every second flank section or in the case of all flank sections is between ⅚ and ¼, preferably between ⅘ and ⅜, and more preferably between ¾ and ⅚ of a distance of the lower to the upper scraper ring.

In the case of an additional exemplary embodiment of the MF expander spring, every other second flank section forms an obtuse angle with the associated upper or lower flat section.

According to another aspect of the present invention, a three-part oil scraper ring comprising an expander spring and an upper and a lower oil scraper ring is provided, wherein the MF expander spring pushes the upper oil scraper ring upwards and pushes the lower oil scraper ring downwards, and both oil scraper rings push outwards.

The present invention will be further clarified below on the basis of various schematic figures. All figures show MF springs comprising suggested scraper rings in an angled view from outside.

Identical or similar reference numerals will be used below in the description as well as in the figures, in order to refer to identical or similar elements and components.

Figure 1:
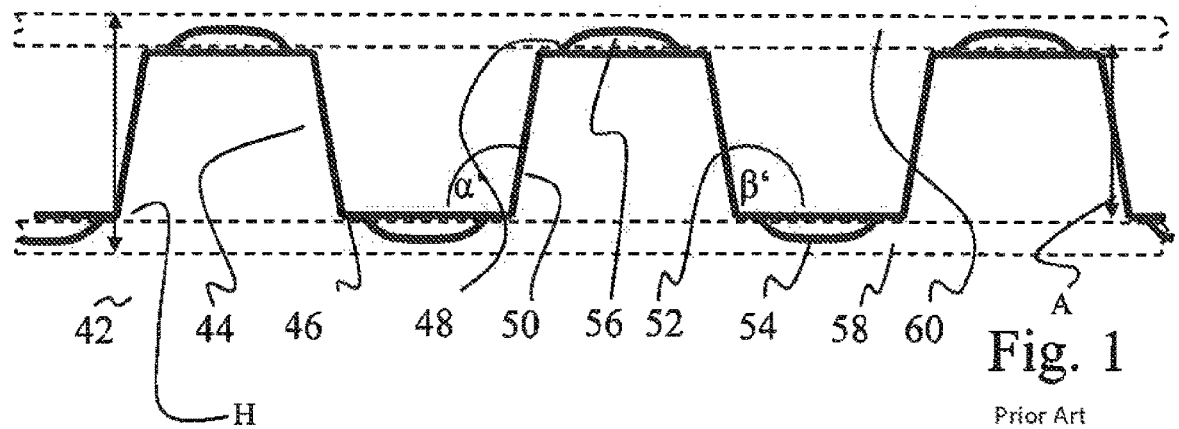
FIG. 1 shows a conventional three-part oil scraper ring.

FIG. 1 shows a conventional three-part oil scraper ring 42. Here, a conventional MF meander spring expander 44 is arranged between an upper scraper ring 60 and a lower scraper ring 58. The MF meander spring expander 44 thereby pushes the lower and the upper scraper ring 58, 60 outwards. The MF meander spring expander 44 thereby comprises lower flat sections 46 and upper flat sections 48, with which the MF meander spring expander 44 abuts against the scraper rings 58, 60 in the axial direction. The MF meander spring expander 44 is to thereby not push the scraper rings downwards and upwards against respective flanks of a piston ring groove, because this would decrease the movability of the piston ring in the circumferential direction. The flat sections are connected to one another via respective flank sections. Starting from right to left, every second flank section 50 runs from top down and every other second flank section 52 runs from bottom to top. Every second flank section 50 forms an obtuse angle α' with every adjacent flat section, and every other second flank section 52 forms an obtuse angle β' with every adjacent flat section. In the case of the conventional embodiment, the flank sections are arranged symmetrically and each have identical obtuse angles α' and β'. The lower flat sections 46 are provided with lower protrusions 54 or axial protrusions 54, respectively, which, on an inner side of the MF meander spring expander 44 located in the radial direction, protrude beyond said inner side in the axial direction. The upper flat sections 48 are provided with upper protrusions 56 or upper axial protrusions 56, respectively, which, on an inner side of the MF meander spring expander 44 located in the radial direction, protrude beyond said inner side in the axial direction. The protrusions thereby in each case engage behind the lower and upper scraper ring and can thus push the latter outwards in the direction of an inner cylinder wall. In the case of blowby, hot gases can advance all the way to the MF meander spring expander 44 and can heat the latter to far beyond a provided operating temperature. When the MF meander spring expander 44 expands in the circumferential direction, it may happen that the MF meander spring expander 44 jams in the circumferential direction and in the axial direction in the gap between the scraper rings and pushes them outwards against an inner cylinder wall with an excessive force, and simultaneously against the oil scraper piston ring groove flanks with an excessive force, which can lead to a strong wear and even to damages to the components. The distance A identifies the distance between the scraper rings or the thickness of the MF meander spring expander 44, respectively, without the protrusions. The height H refers to an overall height of the three-part oil scraper ring, wherein this height H should be smaller than a corresponding width of an oil scraper ring groove in a piston, so that it can still move in the circumferential direction. In the following, the distances or reference numerals A and H, respectively, apply for all scraper rings and figures, even if they had not been entered in all figures.

Figure 2A:
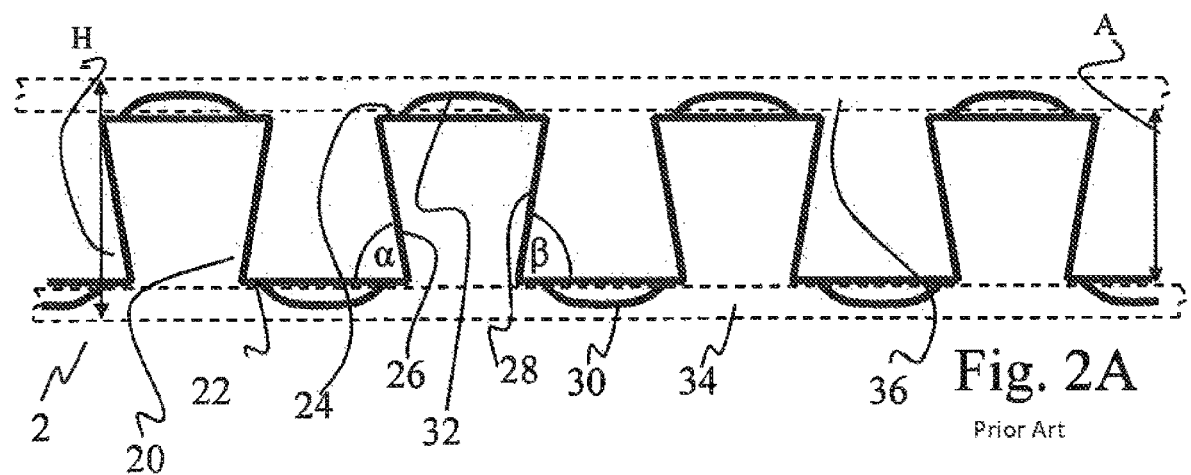
FIGS. 2A and 2B represent various embodiments of three-part oil scraper rings according to the invention, in the case of which all flanks form an acute angle to the respective level flat sections, with which the spring abuts against the oil scraper rings.
Figure 2B:
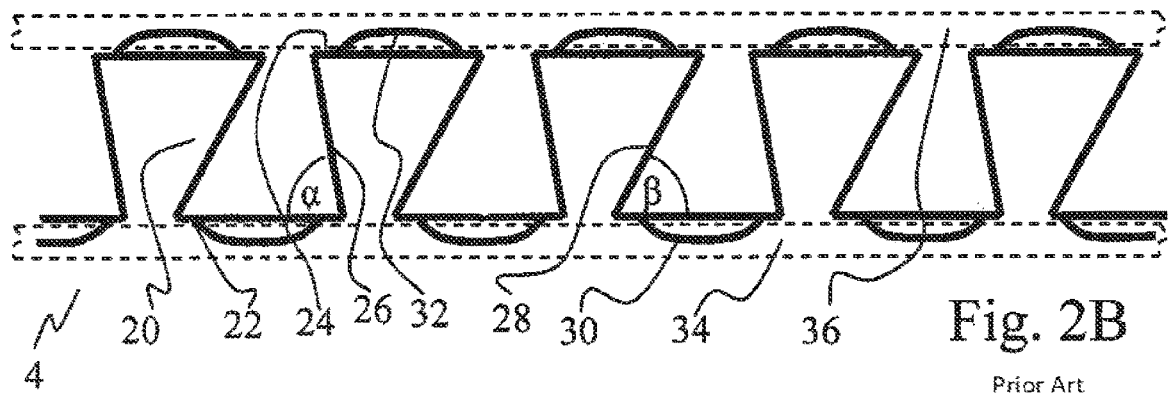

FIGS. 2A and 2B illustrate various embodiments of three-part oil scraper rings according to the invention, in the case of which all flanks form an acute angle to the respective level flat sections, with which the spring abuts against the oil scraper rings.

A three-part oil scraper ring 2 according to the invention is illustrated in FIG. 2A with a meander spring expander (MFE), which has obtuse angles α and β between the flat sections and the flank sections. It can be seen in FIG. 2A that, in contrast to the conventional MF meander spring expander 44 of FIG. 1, the flank sections 26 and 28 are inclined in a different direction and in each case form an obtuse angle with the respective lower and upper flat sections 22, 24. It can be seen in FIG. 2A that, in contrast to the conventional MF meander spring expander 44 of FIG. 1, the flank sections 26 and 28 are inclined in a different direction and in each case form an acute angle with the respective lower and upper flat sections 22, 24. The respective second flank sections 26 and the respective lower and upper flat sections 22, 24 in each case form an acute angle α. The respective other second flank sections 28 and the respective lower and upper flat sections 22, 24 in each case likewise form an acute angle β here.

A MF meander spring expander 20 according to the invention is also arranged between a lower scraper ring 34 and an upper scraper ring 36 in FIG. 2A. The MF meander spring expander 44 thereby pushes the lower and the upper scraper ring 34, 36 outwards or holds them at the defined distance A, respectively. The MF meander spring expander 20 thereby comprises lower, flat sections 22 and upper flat sections 24, with which the MF meander spring expander 20 abuts against the scraper rings 34, 36 in the axial direction. The MF meander spring expander 20 is to thereby not push the scraper rings downwards and upwards against respective flanks of a piston ring groove, because this would decrease the movability of the piston ring in the circumferential direction. The flat sections 22, 24 are connected to one another via respective flank sections 26, 28. Starting from right to left, every second flank section 28 runs from top down and every other second flank section 26 runs from bottom to top. In the case of this embodiment according to the invention, the flank sections are arranged symmetrically and each have identical acute angles between the flanks and the flat sections. The lower flat sections 22 are provided with lower protrusions 30 or lower axial protrusions 30, respectively, which, on an inner side of the MF meander spring expander 20 located in the radial direction, protrude beyond said inner side in the axial direction. The upper flat sections 24 are provided with upper protrusions 32 or upper axial protrusions 32, respectively, which, on an inner side of the MF meander spring expander 20 located in the radial direction, protrude beyond said inner side in the axial direction. As in FIG. 1, the protrusions thereby in each case engage behind the lower and upper scraper ring 34, 36 and can thus push the latter outwards in the direction of an inner cylinder wall. In the case of blowby, hot gases can advance all the way to the MF meander spring expander 20 and can heat the latter to far beyond a provided operating temperature. When the MF meander spring expander 20 expands in the circumferential direction due to such an excessive heating, the MF meander spring expander 20 cannot jam in the gap between the scraper rings, because the flanks can incline more strongly in response to a corresponding expansion, whereby the height A of the MF meander spring expander 20 is decreased. When the MF meander spring expander 20 is compressed in the circumferential direction, its height decreases and a jamming can occur. Even in the case of an excessive heating due to blowby, large forces to the outside against an inner cylinder wall and against the oil scraper piston ring groove flanks can be avoided by means of this embodiment. The present design can thus prevent an excessive wear.

FIG. 2B shows a three-part oil scraper ring 4 according to the invention comprising an MF meander spring expander 20, which is provided with two different acute angles. Every second flank section 26 is inclined more steeply than every other second flank section 28. The oil scraper ring of FIG. 2B uses a slightly different design compared to the design of FIG. 2A. FIG. 2A shows a very symmetrical setup of the MF meander spring expander 20 according to the invention, wherein the flank sections 26, 28 form the essentially identical acute angles α and β to the flat sections 22, 24. In contrast, every second flank section 26 has a different acute angle α to the respective flat sections 22, 24 than the corresponding angle β between every one of the respective other second flank sections 28 and the respective flat sections 22, 24. In this embodiment, the spring is more elastic in the circumferential direction and in the axial direction, because every second flank section 26 is steeper and thus provides a larger elasticity in the circumferential direction, and every other second flank section 28 is flatter and thus provides a larger elasticity in the axial direction. The other components correspond to the disclosure of FIG. 2A and will not be repeated redundantly here once again.

FIGS. 2A and 2B thereby show "trapezoidally corrugated" MF meander spring expanders 20.

Figure 3A:
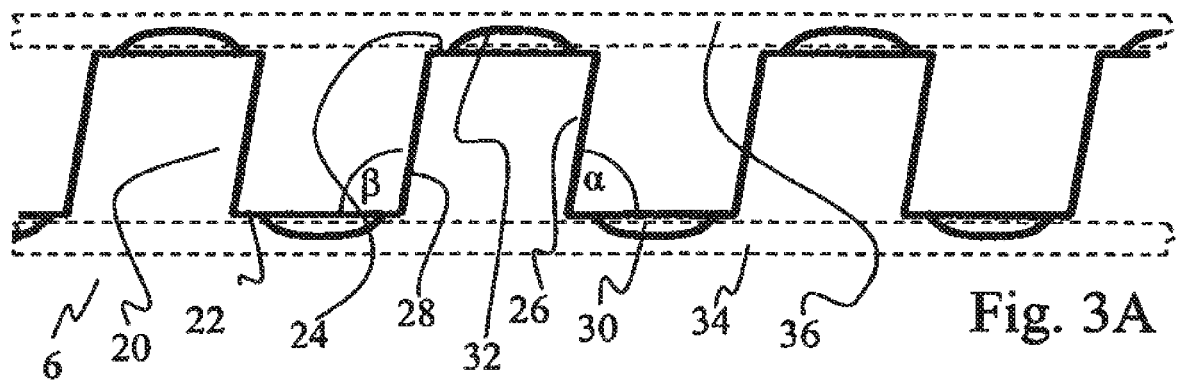
FIGS. 3A and 3B show various embodiments of three-part oil scraper rings according to the invention, in the case of which every one second flank forms an acute angle to the respective level flat sections, and every one of the other second flanks forms an obtuse angle to the level flat sections, with which the spring abuts against the oil scraper rings.
Figure 3B:
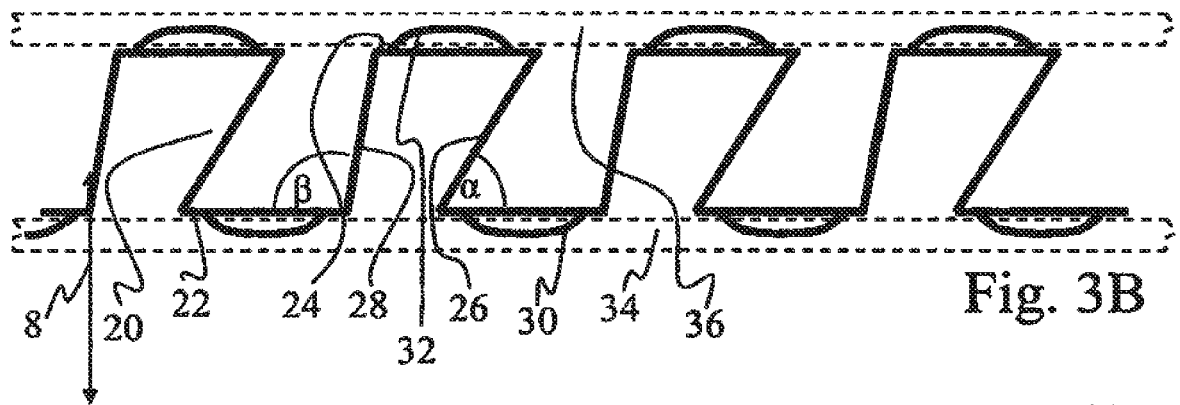

FIGS. 3A and 3B show different embodiments of three-part oil scraper rings according to the invention, in the case of which every one second flank forms an acute angle α to the respective level flat sections, and every one of the other second flanks forms an obtuse angle β to the level flat sections, with which the spring abuts against the oil scraper rings.

FIG. 3A shows a three-part oil scraper ring 4 according to the invention comprising an MF meander spring expander 20, which is provided with obtuse and acute angles. In the handling, every second flank section 26 with an acute angle α to the flat sections is essentially parallel or parallel to every other second flank section 28. In the handling of the spring, every second flank section 26 forms an acute angle β with the flat sections. With an acute angle α, every second flank section 26 is essentially parallel or parallel to every other second flank section 28 in the handling. Every other second flank section 28 forms an obtuse angle β with the corresponding flat sections. Due to the fact that every second flank section 26 is essentially parallel or parallel to every other second flank section 28, the angles α and β combine to 180°.

FIG. 3A can be identified as oil scraper ring with MF meander spring expander 20, which is "corrugated in a diamond-shaped manner". Here, the elasticity in the circumferential direction and the elasticity in the axial direction of the expander 20 can be set relatively easily via the incline of the flanks of the MF meander spring expander 20. Flatter flanks thereby create a larger elasticity in the axial direction and a lower elasticity in the circumferential direction. Steeper flanks thereby create a lower elasticity in the axial direction and a higher elasticity in the circumferential direction. Even when every other second flank section 28 is embodied to be obtuse-angled, the MF meander spring expander 20 cannot jam in an oil scraper ring groove of a piston, because every second flank section 26 is embodied to be acute-angled and ensures an elasticity in the circumferential and axial direction even in response to an excessive heating due to blowby gases.

FIG. 3B shows a three-part oil scraper ring 4 according to the invention, which is provided with an MF meander spring expander 20, as in FIG. 3A, which is provided with obtuse and acute angles. In contrast to the embodiment of FIG. 3A, every second flank section 26 is embodied here with an acute angle α in the handling non-parallel to every other second flank section 28 with an obtuse angle β. FIG. 3B is to thus also be identified as "trapezoidally corrugated" MF meander spring expander 20. Even though it is actually a modification of the embodiment of FIG. 3A and is technically closer to it.

In the circumferential direction, the elasticity can be set here relatively independently of the elasticity in the axial direction of the expander 20. The elasticity in the circumferential direction is mainly determined by the obtuse-angled flanks 28, which are illustrated more steeply. The elasticity in the axial direction is mainly determined by the acute-angled flanks 26, which are illustrated more steeply. Depending on the selection of the corresponding flank steepnesses of the acute-angled (every second) or obtuse-angled (every other second) flanks 26, 28, respectively, the desired elasticities can be attained. This MF meander spring expander 20 can also not jam in an oil scraper ring groove of a piston, because every second flank section 26 is embodied to be acute-angled and ensures an elasticity in the circumferential and axial direction even in response to an excessive heating due to blowby gases.

Figure 4A:
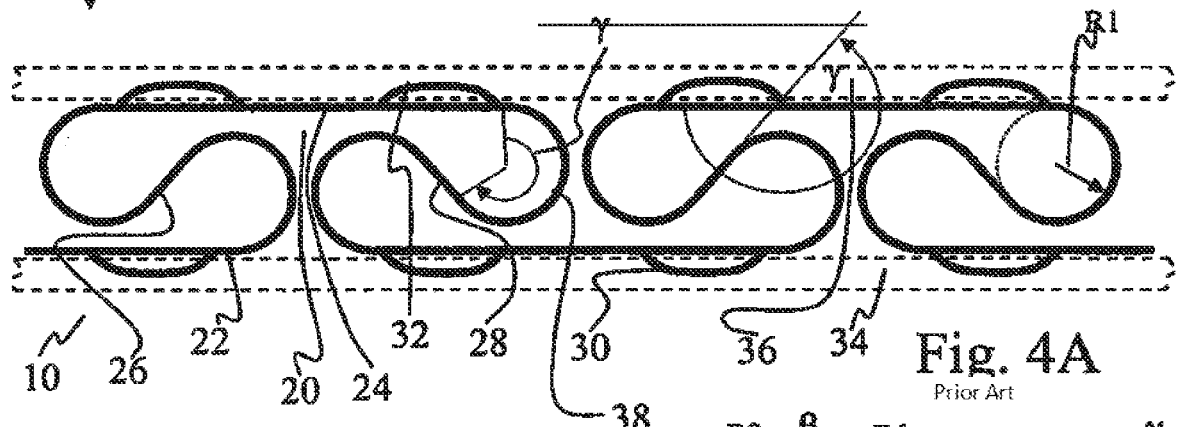
FIGS. 4A and 4B illustrate various embodiments of three-part oil scraper rings according to the invention, in the case of which at least every second flank was bent with a large rounding radius by a reflex angle compared with the level flat sections.
Figure 4B:
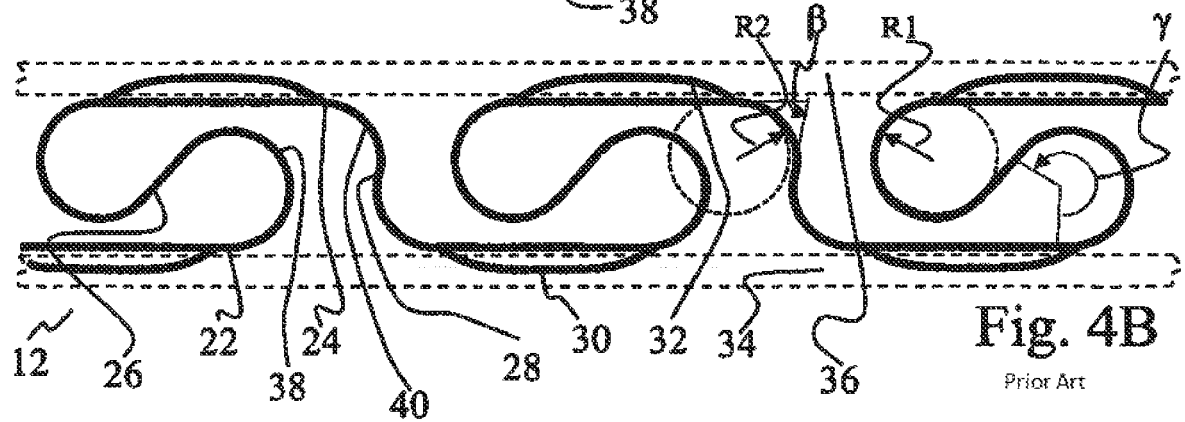

FIGS. 4A and 4B represent various embodiments of three-part oil scraper rings according to the invention, in the case of which at least every second flank was bent with a large rounding radius by a reflex angle γ compared with the level flat sections.

In FIG. 4A, the three-part oil scraper ring 10 according to the invention only has flanks 26, 28, which were bent with a large rounding radius by a reflex angle γ compared with the level flat sections 22, 24. The rounding radius R1 is thereby at least half as large as the distance A of the scraper rings 34, 36. The roundings thereby extend over an angular range of more than 180°, so that the flanks or at least every second one of the flanks run in an opposite direction, namely again towards the flat section, from which the flank was bent out of the metal strip. A large amount of material is used here for the flanks and the roundings with the radius R1, so that a significant elasticity in the circumferential direction and axial direction can be attained. Even if the design should generally show a similar behavior, as in the case of the conventional expander spring 42 of FIG. 1, the MF meander spring expander 20 cannot jam in the oil scraper piston ring groove even in response to an overheating, because the entire structure is much softer than in the case of the conventional spring, wherein in particular the rounding areas 38 contribute significantly to this elasticity.

FIG. 4B shows a three-part oil scraper ring 12 according to the invention comprising an MF meander spring expander 20, the transitions of which in the case of every second flank section 26 were bent to reflex angles γ with bending radii. A part of the embodiment is thus already disclosed by FIG. 4A. The other second flank sections 28 are embodied much shorter here and can also have much smaller rounding radii R2. The other second flank sections 28 can form an obtuse or preferably an acute angle β with the respective flat sections. The other second flank sections 28 can significantly increase an elasticity in the axial direction here. An elasticity of every second flank section 26 thereby provides the majority of an elasticity in the circumferential direction.

The embodiments of FIGS. 4A and 4B additionally have an advantage that an elasticity can be embodied in a non-linear manner in the axial direction. As soon as the upper scraper ring compresses the spring expander 20 to the extent that the distance A between the scraper rings becomes as small as an outer diameter of the roundings, which are bent at a reflex angle, the spring constant increases very strongly in the axial direction. In the case of little blowby, small forces can thus be used in order to minimize an axial play of the oil scraper ring, and in the case of a strong blowby, for example in response to cold starting or run-in conditions, a minimum height of the oil scraper ring can always be ensured without overloading the meander spring.

REFERENCE LIST 2 three-part oil scraper ring according to the invention comprising meander spring expander (MFE) obtuse angled
4 three-part oil ring according to the invention comprising MFE with two different acute angles
6 three-part oil ring according to the invention comprising MFE with two different acute angles
8 three-part oil ring according to the invention comprising MFE with acute and obtuse angles
10 three-part oil ring according to the invention comprising MFE with bending radii and flank sections bent at a reflex angle
12 three-part oil scraper ring according to the invention comprising meander spring expander spring with bending radii and angles bent at a reflex angle and acutely-bent angles
20 MF meander spring expander or MF expander (spring), respectively, according to the invention
22 lower flat section according to the invention
24 upper flat section according to the invention
26 every second flank section 2, 4, 6, 8 . . . according to the invention
28 every other second flank section 1, 3, 5, 7 . . . according to the invention
30 lower protrusion according to the invention
32 upper protrusion according to the invention
34 lower scraper ring according to the invention
36 upper scraper ring according to the invention
38 rounding according to the invention at the reflex angle
48 rounding according to the invention at the acute or obtuse angle
42 conventional three-part oil scraper ring
44 conventional MF meander spring expander
46 lower flat section
48 upper flat section
50 every second flank section
52 every second other flank section
54 lower protrusion
56 upper protrusion
58 lower scraper ring
60 upper scraper ring
R1 rounding radius according to the invention with reflex angle
R2 rounding radius according to the invention with acute angle
A distance between lower and upper oil scraper ring
H height of the three-part oil scraper ring
α' conventional obtuse angle between a flat section and every second flank sections
β' conventional obtuse angle between a flat section and one of the every other second flank sections
α acute angle between a flat section and one of the every second flank sections
β acute or obtuse angle between a flat section and one of the every other second flank sections
γ reflex angle, by which a flank section is bent out of a flat section

The invention claimed is:

1. An expander spring for a three-part oil scraper ring, comprising:
a steel band having a length extending in a circumferential direction and a thickness extending in an axial direction between axially spaced upper and lower surfaces of the band;
wherein the band is corrugated in the axial direction to define a plurality of axially upward and downward extending undulations of the band that extend as a wave structure in the circumferential direction;
wherein the undulations define a plurality of circumferentially spaced upper flat sections for engaging an upper scraper ring in an upward axial direction and a plurality of circumferentially spaced lower flat sections for engaging a lower scraper ring in an opposite lower axial direction, with the upper flat sections being spaced axially from the lower flat sections;
wherein the undulations further define a plurality of flank sections which extend axially between the upper and lower flat sections;
wherein the undulations have a trapezoidal or diamond-shaped configuration when the band is viewed on edge with the upper flat sections arranged above the lower flat sections;
wherein the upper and lower flat sections are provided with axial protrusions for engaging a radially inner edge of the upper and lower scraper rings; and
wherein at least every second flank section forms and acute angle with the associated upper or lower flat section, and wherein every other second flank section forms an obtuse angle with the associated upper or lower flat section.

2. The expander spring for a three-part oil scraper ring according to claim 1, wherein the acute angle is between 85° and 70°.

3. The expander spring for a three-part oil scraper ring according to claim 1, wherein the obtuse angle is between 95° and 120°.

4. The expander spring for a three-part oil scraper ring according to claim 1, wherein an amount of a difference between the acute angle and 90° is larger than an amount of a difference between the acute angle and 90° in each case.

5. The expander spring for a three-part oil scraper ring according to claim 1, wherein the acute angle is between 55° and 35°, wherein the obtuse angle is between 105° and 120°.

6. A three-part oil scraper ring comprising an expander spring according to claim 1 and an upper and a lower scraper ring, wherein the expander spring supports the upper scraper ring to the top and the lower scraper ring to the bottom, and pushes both scraper rings to the outside.

7. The expander spring for a three-part oil scraper ring according to claim 2, wherein the acute angle is between 82° and 73°.

8. The expander spring for a three-part oil scraper ring according to claim 2, wherein the acute angle is between 79° and 76°.

9. The expander spring for a three-part oil scraper ring according to claim 3, wherein the obtuse angle is 98° and 117°.

10. The expander spring for a three-part oil scraper ring according to claim 3, wherein the obtuse angle is between 101° and 114°.

11. The expander spring for a three-part oil scraper ring according to claim 5, wherein the acute angles is between 52° and 38°, wherein the obtuse angle is between 108° and 117°.

12. The expander spring for a three-part oil scraper ring according to claim 5, wherein the acute angle is between 49° and 41°, wherein the obtuse angle is between 111° and 114°.

13. The expander spring for a three-piece oil scraper ring according to claim 1, wherein the thickness of the band is uniform among the upper and lower flat sections and the flank sections.

* * * * *